United States Patent Office 3,825,545
Patented July 23, 1974

3,825,545
ALKYLATION OF HETEROCYCLIC COMPOUNDS
Donald M. Fenton, Anaheim, Calif., assignor to Union Oil Company of California, Los Angeles, Calif.
No Drawing. Filed Dec. 10, 1970, Ser. No. 97,034
Int. Cl. C07d 33/30
U.S. Cl. 260—283 R     11 Claims

ABSTRACT OF THE DISCLOSURE

It is disclosed that heterocyclic compounds can be alkylated with an alcohol or an amine as the alkylating agent in the presence of a Group VIII noble metal catalyst which is complexed with a biphyllic ligand. The alkyl heterocyclics are useful as solvents for terpenes or resins or as intermediates in the manufacture of dyes. The process offers an advantage in the alkylation of the heterocyclic nitrogen compounds since catalysts conventionally used for aromatic alkylation such as Friedel-Crafts catalysts, hydrofluoric acid or sulfuric acid are not entirely suitable since they are reactive with the nitrogen of the heterocyclic reactant. A typical reaction comprises the alkylation of quinoline with an alcohol or amine in the presence of a ruthenium-biphyllic ligand complex as the catalyst. Mild conditions can be employed for this alkylation, including temperatures from 30° to 300° C. and pressures from 1 to about 1000 atmospheres, sufficient to maintain a liquid phase under the alkylation conditions. Preferably the alkylation is performed at neutral to alkaline conditions.

DESCRIPTION OF THE INVENTION

This invention relates to the alkylation of heterocyclic nitrogen compounds and, in particular, relates to the catalysis of such alkylation.

Alkyl heterocyclic compounds are useful for a variety of purposes including uses as solvents for resins and terpenes and as intermediates in the manufacture of dyes. Various methods for the alkylation of aromatic compounds using Friedel-Crafts catalysts, sulfuric acid or hydrofluoric acid are not entirely satisfactory when applied to the heterocyclic nitrogen compounds. The nitrogen of the heterocyclic compounds is reactive under acidic conditions, and, accordingly, these are not satisfactory catalysts. Zinc dust has been employed for the alkylation of heterocyclic nitrogen compounds, however, there are handling problems and hazards involved in the use of this catalyst in commercial preparations. Accordingly, there exists a need for a catalyst which can effect the alkylation of heterocyclic nitrogen compounds without undesirable side reactions.

I have now found that heterocyclic nitrogen-containing compounds can readily be alkylated by reaction with an alcohol or an amine in the presence of a catalyst comprising a Group VIII noble metal complex with a biphyllic ligand. Use of these alkylating agents is also unique with this catalysis. This alkylation can be effected under relatively mild conditions and proceeds according to the following reactions:

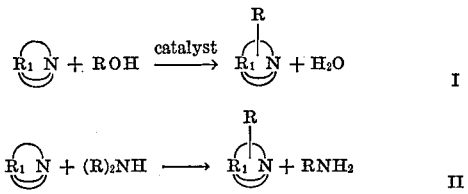

The conditions for the reaction can include temperatures from about 30° to 300° C., preferably from about 150° to 250° C. and pressures from about 1 to about 1000 atmospheres absolute, preferably from 1 to about 10 atmospheres and sufficient to maintain liquid phase conditions. The alkylation can be performed at any pH conditions; preferably neutral or alkaline conditions are used to avoid side reactions between the reactants and acidic components.

Various heterocyclic compounds can be alkylated in accordance with this invention. The alkylation is effected on the heterocyclic ring. The heterocyclic compounds which can be alkylated in accordance with this invention are those having from 9 to about 18 carbons which have di- or tricyclic structures with one or two heterocyclic nitrogens in a 6-membered, conjugated, unsaturated, heterocyclic ring. These compounds can also contain 1 to about 3 dependent alkyl groups having from 1 to about 6 carbons, provided that there is an unsaturated and alkylatable carbon in the heterocyclic ring. Examples of suitable heterocyclic nitrogen compounds include quinoline, isoquinoline, acridine, phenanthridine, and their nitrogen position isomers, etc. The aforementioned parent compounds can also bear from 1 to about 3 alkyl groups having up to about 6 carbons and examples of such compounds include 4-ethylquinoline, 3,5-dimethylquinoline, 5-isopropylquinoline, 5,7 - diamylisoquinoline, 1,8-dimethylacridine, 2-amylacridine, 2-butylphenanthridine, 3,8-diethylphenanthridine, etc.

The alkylating agent for reaction I is an alcohol which can be an alkyl or cycloalkyl saturated alcohol. Suitable alkylating agents can contain from 1 to about 20 carbons and can be branch or straight chained or can include a cyclic group having from 4 to about 12 cyclic carbons with up to about 3 alkyl groups dependent thereon. Examples of suitable alcohols include methanol, ethanol, propanol, isopropanol, butanol, isobutanol pentanol, 2-ethylhexanol, hexanol, heptanol, octanol, nonanol, decanol undecanol, dodecanol, pentadecanol, heptadecanol, octadecanol, nonadecanol, eicosonol, cyclobutanol, cyclopentanol, methylcyclopentanol, cyclohexanol, ethylcyclohexanol, dimethylcyclohexanol, octylcyclohexanol, cycloheptanol, dimethylcycloheptanol, tributylcycloheptanol, cyclooctanol, cyclodecanol, dimethylcyclodecanol, etc. Alcohols that are preferred are those having from 4 to about 12 carbons and the straight chain alkanols because of the greater value and applications of the heterocyclic nitrogen derivatives containing alkyl side-chains from these alcohols.

Amines which are useful as alkylation agents in reaction II include the saturated hydrocarbon amines such as alkyl and cycloalkyl amines which have from 1 to about 25 carbons with alkyl or cycloalkyl groups that have from 1 to about 18 carbons. Cycloalkyl groups, when present, can have from 4 to about 12 cyclic carbons. The amine can be a primary, secondary or tertiary amine and the alkylation results in a reduction in the degree of nitrogen substitution of the amine. When the amine is in deficient supply and the reaction is run to exhaustion of the amine or when a primary amine is used, ammonia is formed. Intermediate conversions of the amine can form ammonia and primary amines from secondary amines and ammonia, primary and secondary amines from tertiary amines.

Examples of useful amines include: methylamine, ethylamine, isopropylamine, t-butylamine, amylamine, 2-ethylhexylamine, decylamine, dodecylamine, pentadecylamine, cyclopentylamine, methylcyclopentylamine, cyclohexylamine, diethylcyclohexylamine, cycloheptylamine, methylcyclooctylamine, cyclodecylamine, cycloundecylamine, cyclododecylamine, 3-cyclohexylpentylamine, diethylamine, trimethylamine, dicyclohexylamine, dibutylamine, triamylamine, methyldiisopropylamine, octadecylmethylamine, tri(2-ethylhexyl)amine, etc. Amines which are preferred are those having straight chain alkyl groups and those having from 4 to about 12 carbons because of the greater usefulness of heterocyclic nitrogen derivatives containing these alkyl sidechains.

The catalyst of the invention comprises a Group VIII noble metal which is in complex association with a biphyllic ligand. A biphyllic ligand is a compound having at least one atom with a pair of electrons capable of forming a coordinate covalent bond with a metal atom and simultaneously having the ability to accept the electron from the metal, thereby imparting additional stability to the resulting complex. Biphyllic ligands can comprise organic compounds having at least about 3 carbons and containing arsenic, antimony, phosphorus or bismuth in a trivalent state. These ligands are known in the art and, accordingly, are not part of the essence of the invention. Of these the phosphorus compounds, i.e., the phosphines, are preferred; however, the arsines, stibines and bismuthines can also be employed. Typical of the suitable ligands are those having the following structure:

$$E(R)_3$$

wherein E is trivalent phosphorus, arsenic, antimony or bismuth; and wherein R is the same or different alkyl having 1 to 18 carbons, cycloalkyl having 4 to 18 carbons and/or aryl having 6 to 18 carbons. Examples of which are methyl, butyl, nonyl, cyclopentyl, cyclohexyl, cyclodecyl, amylcyclohexyl, phenyl, tolyl, xylyl, 2-phenyl-4-butyloctyl, tetramethylphenyl, etc. Preferably at least one R is aryl, e.g., phenyl, tolyl, xylyl, etc., preferably having 6 to 9 carbons and, most preferably, the ligand is triaryl.

Examples of suitable biphyllic ligands having the aforementioned structure and useful in my invention are the following: trimethylphosphine, triethylarsine, triethylbismuthine, triisopropylstibine, dioctylcycloheptylphosphine, tricyclopentylphosphine, tricyclohexylphosphine, ethyldiisopropylstibine, tricyclohexylphosphine, methyldiphenylphosphine, methyldiphenylstibine, triphenylphosphine, triphenylbismuthine, tri(o-tolyl) - phosphine, phenyldiisopropylphosphine, phenyldiamylphosphine, ethyldiphenylphosphine, phenylditolylphosphine, xylyldiphenylarsine, trixylylstibine, cyclopentyldixylylstibine, dioctylphenylphosphine, tridurylphosphine, trixylylbismuthine, etc. Of the aforementioned, the aryl phosphines, preferably the diarylphosphines and, most preferably, the triarylphosphines (e.g., triphenylphosphine) are employed because of the increasing activity of the phosphines with increasing aromaticity.

The Group VIII nobel metal may be ruthenium, rhodium, palladium, osmium, iridium or platinum. Ruthenium is preferred for its greater activity. A catalytic quantity of the metal is used (e.g., 0.002–2% of the reaction medium) and the metal can be added in any convenient manner such as a soluble salt, complex, acid or oxide or salt. Preferably the metal is added as a salt such as a halide (chloride, bromide, fluoride, iodide), nitrate nitrite, $C_1$ to $C_{10}$ carboxylate, e.g., acetate, propionate, butyrate, valerate, benzoate, octanoate, etc. Examples of useful Group VIII nobel metal sources are rhodium nitrate, platinum nitrate, palladium chloride, rhodium fluoride, palladium hydroxide, palladium cyanide, osmium sulfate, rhodium sulfite, rhodium carbonate, palladium carbonate, platinum propionate, ruthenium acetate, etc. Examples of suitable complexed sources are osmium carbonyl, ruthenium pentacarbonyl, potassium osmium chloride, osmium dipyridyl chloride, potassium ruthenium fluoride, rhodium carbonyl, iridium hydride triphenylphosphine, potassium rhodium fluoride, palladium nitroso chloride, chloroplatanic acid, etc. The particular source of the metal or element not being part of the essence of the invention since the metal from such widely varied sources will, nevertheless, form a complex with the aforementioned biphyllic ligand.

The Group VIII metal may be complexed with the above-described biphyllic ligand before being introduced into the reaction medium or the complex may be formed "in situ" by simply adding a compound of the metal and the biphyllic ligand directly into the reaction medium. In either case, it is generally preferable that the quantity of biphyllic ligand be in excess (e.g., 10–300%) of that stoichiometrically required to form a complex with the Group VIII metal. The complex has from 1 to about 5 moles of biphyllic ligand per atom of the metal and other components such as hydride, or soluble anions such as sulfate, nitrate, $C_1$–$C_5$ carboxylates (e.g., acetate, propionate, isobutyrate, valerate, etc.), halide, etc., may be, but need not be, included in the complex catalyst of this invention. These components may be incorporated in the catalyst by the formation of the catalyst complex from a Group VIII metal salt of the indicated anions.

The reaction is performed under liquid phase conditions. Either the alkylating agent or the heterocyclic reactant, or both, can be used in excess and furnish a liquid medium for the reaction. The reaction may also be performed in a liquid organic solvent, i.e., a liquid in which the reactants and the catalyst are soluble. Such a solvent should also be inert to the reactants, catalyst and products under the reaction conditions. Suitable solvents include, for example, hydrocarbons and ethers. Examples of hydrocarbon solvents are pentane, hexane, heptane, isooctane, dodecane, naphtha, cyclohexane, indane, benzene, toluene, xylene, durene, pseudocumene, Tetraline, etc. Examples of ethers are the alkyl and aryl ethers such as diisopropyl ether, di-n-butyl ether, ethylene glycol diisobutyl ether, methyl-o-tolyl ether, diethyl ether, diethylene glycol diethyl ether, triethylene glycol diethyl ether, tetraethylene glycol dimethyl ether, etc.

The reaction may be performed at relatively low temperatures, e.g., 30° to 300° C. and preferably 150° to 250° C. and at low pressures, typically from about 1 to about 100 atmospheres absolute. Higher pressures can be employed if desired, however, such higher pressures do not serve any useful purpose in the reaction. Accordingly, it is desirable to employ only sufficient pressure to maintain liquid phase conditions.

The reaction is preferably performed under anhydrous conditions with reaction media containing less than 10, preferably less than 5, and most preferably less than 2, weight percent water. To maintain the reaction anhydrous, the water formed during the reaction can be continuously or intermittently removed by suitable methods. During the processing, portions of the reaction medium can be removed and dehydrated by distillation and returned to the reaction zone. Alternatively, the reaction can be discontinued when the water content of the medium becomes excessive, e.g., about 5 to 10 weight percent. In a preferred embodiment, the water can be continuously removed by its distillation during the reaction and, if desired, a suitable additive which forms a water azeotrope can be employed to facilitate this distillation. The azeotrope former should be inert to the reactants, products and catalyst under the reaction conditions. Suitable agents are hydrocarbons such as benzene, toluene, etc. or substituted hydrocarbons such as propylene chloride. Many of the alcohols form azeotropes and these can conveniently also serve as the azeotroping agent and can be separated from the aqueous distillate and recycled to the reaction zone.

The reaction is also preferably performed under basic conditions. Since the reactant mixture is somewhat basic, added base may not be necessary for the preferred condition. When more alkaline conditions are desired, an alkaline material such as an alkali metal hydroxide, e.g., sodium, potassium, lithium hydroxides, etc. can be added in an amount from about 0.1 to about 5.0 weight percent of the reaction medium.

The reaction may be carried out in a batch or in a continuous process. In the batch process, the reactants, catalysts and solvent, when employed, can be charged to the reaction zone and the reaction can be performed until a substantial amount or all of the reactant heterocyclic nitrogen compound has been alkylated. One or more of the reactants can be continuously charged during this batch processing or some of the products can be continuously withdrawn during the conversion. The continuous introduction of the reactants and the continuous withdrawal of a crude reaction product containing the alkylated heterocyclic nitrogen compound results in continuous processing. The crude reaction product removed from the alkylation can be treated in a conventional manner to recover the products, e.g., by solvent extraction, distillation, crystallization, etc. The reaction medium remaining after removal of the alkylated, heterocyclic nitrogen compound can be recycled to the reaction zone together with any of the catalysts and unconverted heterocyclic nitrogen compound, alcohol or amine which are separated during the product recovery.

The following examples will serve to illustrate a mode of practice of the invention and to demonstrate results obtainable thereby.

EXAMPLE 1

A laboratory flask of 250 milliliter capacity is equipped with a Dean-Stark tube. A reaction mixture comprising 0.5 gram ruthenium trichloride, 3 grams triphenylphosphine, 70 milliliters of 90 weight percent quinoline and 25 milliliters octanol is introduced into the flask. The flask contents are then heated to reflux temperatures and maintained at refluxing for 24 hours. During this refluxing, some water is distilled. Upon completion of the refluxing period, analyzed and found to contain 20 grams of isomeric octyl quinolines.

When the experiment is repeated with cyclohexanol, isomeric cyclohexyl quinolines can be obtained.

EXAMPLE 2

The flask is charged with 30 grams quinoline, 0.5 gram ruthenium trichloride, 3 grams triphenylphosphine and 50 milliliters tributylamine. The flask contents are heated to and maintained at reflux temperature for 24 hours. Upon completion of the refluxing period the contents are analyzed and found to contain some butyl quinoline and 15 grams of dibutylquinoline.

When the experiment is repeated with dibutylamine, similar results are obtained.

When the experiment is repeated with di(n-octyl)amine and ethyl ditolylphosphine substituted for the dibutylamine and triphenylphosphine, respectively, octylquinolines can be obtained.

When the experiment is repeated with a palladium complex with butyl diphenyl phosphine as the catalyst, butyl quinolines can be obtained.

EXAMPLE 3

A steel bomb of 300 milliliter capacity is charged with 50 milliliters quinoline, 50 milliliters butanol, 0.5 gram ruthenium trichloride and 4 grams triphenylphosphine. The bomb is pressured to 400 p.s.i.g. with nitrogen and heated to and maintained at 150° C. for two hours and then at 200° C. for an additional two hours while rocking the bomb to agitate its contents. Upon completion of the reaction period, the bomb contents are analyzed and found to contain butyl and dibutyl quinolines.

When the experiment is repeated with substitution of the quinoline with acridine, or 2-methylphenanthridine as the heterocyclic reactant, alkylation of these substrates can also be obtained.

The invention has been illustrated by the preceding examples which are intended solely to teach a mode of practice of the invention. It is not intended that the invention be unduly limited by this illustration.

I claim:

1. The method for the preparation of alkyl heterocyclic nitrogen compounds by contacting a heterocyclic nitrogen compound having from 9 to about 18 carbons and a condensed di- or tricyclic structure having one heteronitrogen atom and at least one unsubstituted, alkylatable carbon in a 6-membered, conjugated, unsaturated, heterocyclic ring condensed with one or two hydrocarbon benzo rings, with up to 3 alkyl groups dependent therein and having from 1 to about 6 carbons with an alkyl alcohol having from 1 to about 20 carbons or a cycloalkyl alcohol having a cyclic group with 4 to 12 cyclic carbons and up to 20 total carbons in the presence of a catalyst consisting essentially of a complex of a Group VIII noble metal with from 1–5 moles of a biphyllic ligand per atom of said metal having the following structure:

$$ER_3$$

wherein:

E is trivalent phosphorus, arsenic, antimony or bismuth;

R is the same or different alkyl having 1 to 18 carbons, cycloalkyl having 4 to 10 carbons, phenyl or alkylphenyl having 6 to 18 carbons; and maintaining the conditions of said contacting at a temperature of from 30° to 300° C. and a pressure from 1 to about 100 atmospheres, sufficient to maintain liquid phase conditions and thereby alkylate a ring carbon of said heterocyclic nitrogen compound.

2. The method of claim 1 wherein said complex is a ruthenium complex with said biphyllic ligand containing at least one of said phenyl and alkylphenyl groups.

3. The method of claim 1 wherein said complex is a ruthenium complex with said biphyllic ligand containing three of said phenyl and alkylphenyl groups.

4. The method of claim 3 wherein said biphyllic ligand is triphenylphosphine.

5. The method of claim 1 wherein said heterocyclic nitrogen compound is quinoline.

6. The method of claim 2 wherein said heterocyclic nitrogen compound is contacted with an alkanol having from 4 to 12 carbons.

7. The method of claim 1 wherein the temperature of contacting is maintined from 150° to 250° C.

8. The method of claim 1 wherein an excess quantity of said biphyllic ligand is present comprising from 10 to 300 percent of that contained in said complex.

9. The method of claim 1 wherein said contacting is effected under anhydrous conditions.

10. The method of claim 1 wherein said liquid phase contains from 0.1 to 5.0 weight percent of an alkali metal hydroxide.

11. The method for the alkylation of quinoline by contacting quinoline with an alkyl alcohol having from 4 to 12 carbons in the presence of a catalyst consisting essentially of the complex of ruthenium with from 1 to 5 mols of a biphyllic ligand per atom of said ruthenium, said ligand having the following structure:

$$PR_3$$

wherein: R is phenyl or alkylphenyl having 6 to 18 carbons; and maintaining the conditions of said contacting at a temperature of from 150° to 250° C. and a pressure from 1 to about 100 atmospheres, sufficient to maintain liquid phase conditions and thereby alkylate a ring carbon of said quinoline.

References Cited

UNITED STATES PATENTS

| | | | |
|---|---|---|---|
| 2,502,175 | 3/1950 | Rieger | 260—283 |
| 3,448,158 | 6/1969 | Slough | 260—604 |

(Other references on following page)

| | | | |
|---|---|---|---|
| 3,454,644 | 7/1969 | Dewhirst | 260—570.9 |
| 3,644,522 | 2/1972 | Brake | 260—604 |
| 3,670,034 | 6/1972 | Robinson | 260—283 |
| 3,102,899 | 9/1963 | Cannell | 260—439 R |
| 2,391,139 | 12/1945 | Dickey | 260—283 R |
| 3,130,237 | 4/1964 | Wald | 260—283 R |
| 3,354,165 | 1/1967 | Myerly et al. | 260—283 R |
| 3,428,641 | 2/1969 | Myerly et al. | 260—283 R |

OTHER REFERENCES

Wilkinson: Chem. Abstr., vol. 74, col. 88127 n, abstracting Ger. 2,034,908 (1970).

DONALD G. DAUS, Primary Examiner

U.S. Cl. X.R.

260—279 R, 286 A, 288 P, 429, 440, 441, 446, 447, 617.2, 632 R